US 6,626,626 B2

(12) United States Patent
Hartmann et al.

(10) Patent No.: US 6,626,626 B2
(45) Date of Patent: Sep. 30, 2003

(54) ASSEMBLY UNIT INCLUDING A COMPONENT AND AT LEAST ONE SCREW

(75) Inventors: Gunther Hartmann, Alsfeld (DE); Wolfgang Sommer, Gemünden/Wohra (DE); Frank Wagner, Grossen Buseck (DE)

(73) Assignee: Kamax-Werke Rudolf Kellermann GmbH & Co. KG, Osterode am Harz (DE)

( * ) Notice: Subject to any disclaimer, the term of this patent is extended or adjusted under 35 U.S.C. 154(b) by 0 days.

(21) Appl. No.: 10/008,976

(22) Filed: Nov. 8, 2001

(65) Prior Publication Data

US 2002/0054807 A1 May 9, 2002

(30) Foreign Application Priority Data

Nov. 9, 2000  (DE) .......................................... 100 55 405

(51) Int. Cl.$^7$ ................................................ F16B 21/18
(52) U.S. Cl. ....................................... 411/353; 411/999
(58) Field of Search ................................ 411/107, 352, 411/353, 999

(56) References Cited

U.S. PATENT DOCUMENTS

| | | | | |
|---|---|---|---|---|
| 1,409,606 A | * | 3/1922 | Stendahl ...................... 411/353 |
| 3,474,847 A | * | 10/1969 | Bedford, Jr. ................. 411/352 |
| 3,502,130 A | * | 3/1970 | Gulistan ....................... 411/361 |
| 4,212,224 A | * | 7/1980 | Bragg et al. ................. 411/337 |
| 4,924,533 A | * | 5/1990 | Stairs, Jr. ...................... 4/252.1 |
| 5,782,595 A | * | 7/1998 | Schneider ..................... 411/352 |
| 6,176,665 B1 | * | 1/2001 | Bondarowicz et al. ....... 411/424 |
| 6,280,132 B1 | * | 8/2001 | Szczukowski et al. ....... 411/353 |
| 6,309,156 B1 | * | 10/2001 | Schneider ..................... 411/353 |
| 2002/0009350 A1 | * | 1/2002 | Radtke | |

FOREIGN PATENT DOCUMENTS

| | | | |
|---|---|---|---|
| DE | 25 49 727 A1 | 5/1977 | |
| DE | 195 46 072 C2 | 12/1995 | |
| DE | 196 51 838 A1 | 12/1996 | |
| DE | 198 18 369 A1 | 7/1999 | |
| DE | 29804041 U1 | * 7/1999 | ............. F02F/1/00 |
| EP | 0 389 783 | 2/1990 | |
| WO | WO 95/21335 | 8/1995 | |

* cited by examiner

*Primary Examiner*—Lynne H. Browne
*Assistant Examiner*—Jori Schiffman
(74) *Attorney, Agent, or Firm*—Thomas, Kayden, Horstemeyer & Risley LLP

(57) ABSTRACT

An assembly unit (1) includes a component (2), one ore more screws (3) and bushes (18). The screw (3) includes a shank (5) at least partially including a thread (10), a head (4) being designed and arranged to rotate the screw (3) and a supporting surface (6) facing the component (2). The supporting surface (6) is designed and arranged to directly contact the component (2) after assembly without contacting the bush (18) to transmit an axial force. The component (2) includes a through hole (17) for each screw (3). The bush (18) is associated with the screw (3), and it is designed and arranged to be fixedly connected in the respective through hole (17). The bush (18), the screw (3) and the component (2) are designed and arranged to be locked and aligned in an axial direction. This is achieved by the diameter of the through hole (17), the outer diameter and the inner diameter (28) of the bush (18) and the shank (5) of the screw (3) being designed and arranged with respect to one another in a way that the screw (3) after its pre-assembly protrudes through the through hole (17) in a fixed manner.

26 Claims, 5 Drawing Sheets ated at the bush, the elements in combination with the screw forming an axial lock. Consequently, the bush gets a more complicated design. In this case, the thread of the screw may fulfill part of the axial lock. There only is a relation between the diameter of the through hole being located in the component and the diameter of the shank of the screw in a way that the screw together with the bush pass through the through hole and have to be inserted into the through hole, respectively. However, axial alignment of the screw at the component does not take place since the screw is arranged to be only movable to a limited extent. This may be advantageous for screwing the screw into the work piece if it is ensured that the screw finds the entrance into the thread being located into the work piece in a centered way. Due to the possibility of tilting the excess of the screws with respect to one another entrance of the free end of the shank into the thread in the work piece may only be realized to some extent. These disadvantages may be counteracted by the bush as third component within the assembly unit having a relatively great axial length. Especially, it may be designed to be substantially longer than the thickness of the component. Due to the length of the bush, the length of the screw also has to be increased. As a result, not only costs are increased, but in some cases there is a negative effect on the function. Using such bushes in assembly units including at least three single elements is disadvantageous since the bush is subjected to tension while the screw is being screwed into the work piece. In case the bushes are made of comparatively thin deformable sheet metal, there is the danger of different deformations of the bushes occurring during tightening of the screws in a way that it is only possible to apply reproducible pre-tensioning forces to a limited extent.

ASSEMBLY UNIT INCLUDING A COMPONENT AND AT LEAST ONE SCREW

CROSS REFERENCE TO RELATED APPLICATIONS

This application claims the benefit of co-pending German Patent Application No. 100 55 405 entitled "Montageeinheit aus einem Bauteil und mindestens einer Schraube", filed on Nov. 9, 2000.

FIELD OF THE INVENTION

The present invention generally relates to an assembly unit including a component and at least one screw. More particularly, the present invention relates to an assembly unit including a bush which is located in a through hole in a way to be unrotatable. Generally, assembly technology increasingly requires assembly units in which a plurality of components forms a pre-assembled unit. The assembly unit including a component and usually a plurality of screws is then connected to a work piece. As a typical example for this technology, an upper element and a lower element have to be connected by one or more screws. The upper element as the component and the plurality of screws are combined to form a pre-assembled assembly unit to which the screws are captively connected. The assembly unit is then connected to the lower element by tightening the screws one after the other or simultaneously, especially with the use of a multi-spindle automatic screwing apparatus. Such assembly units are typically used in the production of automobiles. For example, the cylinder head cover or a cover of a transmission forms the component which is to be connected with the work piece by screws, in this case, the cylinder block and the housing of the transmission, respectively. Realizing such assembly units allows for a great level of pre-manufacture. The screws are already located at the component in a captive, aligned and pre-assembled way. During transportation, they are safe from being damaged, and they allow for fast connection with the work piece.

BACKGROUND OF THE INVENTION

An assembly unit is known from International Application WO 95/21335. The known assembly unit includes a component, for example a cover of a housing, and at least one fixing element in the form of a screw. A third element is associated with each screw. This third element is a bush which is used to capture the screw. The bush is made of metal, especially of sheet metal. The bush increases the cost of manufacture of the known assembly unit. The bush is pressed into a respective through hole being located at the component which requires a separate pre-assembly step. The bush is fixed in the through hole of the component due to frictional engagement. The bush has a structural height which is a multiple of the structural height of the component in the region of the through hole. The screw itself also has a respective shape and a great axial length. A ring flange is located in the region of the shank of the screw, the ring flange including ring channels at both sides. The ring flange has to be produced at the shank of the screw in addition to the thread. The size of the ring flange is coordinated with the size of a collar being located at the bush in a way that an axial lock is formed, the axial lock still allowing for a respectively great axial movement in a certain region of movement in a way that the screws in the pre-assembled position are located to be captive, but not fixed at the component. There also is the possibility of not arranging a ring flange at the screw. In this case, special elements have to be arranged at the bush, the elements in combination with German Patent Application No. 196 51 838 A1 teaches a component being made of plastic material which is connected to a work piece by screws with an intermediate arrangement of a seal. A bush protruding through the component and being connected to the seal is used. The screw has to include a separately produced ring flange which cooperates with the bush in the sense of an axial lock. In this way, the screw is arranged in a lose, but captive way at the bush. The bush is a third element of the assembly unit in addition to the component and the screw. The bush does not necessarily have to extend through the entire through hole in the component.

German Patent No. 195 46 072 C2 shows a bush having a shorter axial length and including a conical collar only partly engaging a partially conical through hole in the component under frictional engagement. The captive arrangement is realized by frictional forces in a way that the construction is respectively unsafe. The bush being designed in the form of a disc finally is located between the supporting surface at the head of the screw and the respective counter surface at the component. In this way, the bush is clamped, and there generally are similar disadvantages, as this has been described above.

Some known assembly units use screws having a trilobulare cross section in the region of the shank and which produce a thread. This allows for the advantage of not having to use the bush as a third element. On the other hand, there is the danger of chips occurring when the screws are screwed into the through holes in the component. Such chips are not acceptable in combination with special work pieces, for example with transmissions of automobiles. Furthermore, the known screw having a trilobulare cross section has the disadvantage of the carrying portion of the thread not being constant over the circumference. Changing screwing moments occur during assembly.

SUMMARY OF THE INVENTION

The present invention generally relates to an assembly unit. More particularly, the present invention relates to an assembly unit including a component, one ore more screws and the same number of bushes. The screw includes a shank at least partially including a thread, a head being designed and arranged to rotate the screw and a supporting surface facing the component. The supporting surface is designed and arranged to directly contact the component after assembly without contacting the bush to transmit an axial force. The component includes a through hole for each screw. The bush is associated with the screw, and it is designed and arranged to be fixedly connected in the respective through hole. The bush, the screw and the component are designed and arranged to be locked and aligned in an axial direction. This is achieved by the diameter of the through hole, the outer diameter and the inner diameter of the bush and the shank of the screw being designed and arranged with respect to one another in a way that the screw after its pre-assembly protrudes through the through hole in a fixed manner.

The novel assembly unit is also suitable for screws which do not produce a thread, for example for screws having a metric thread. The screws are securely connected to the pre-assembled assembly unit, and their axes are especially located in a perpendicular direction. Furthermore, the screws are captively connected to the component in the pre-assembled position. To be captively connected is to be understood as being connected in away that the screw is detachable from the component, but it cannot get lost unintentionally.

The novel assembly unit includes one or more screws which may also have a metric thread. However, it is also possible to use screws which form or produce a thread, preferably screws which produce a thread during screwing without producing chips. There is a certain relation between the diameter of the through hole being located in the component, a bush which is to be fixedly arranged in the through hole and the size of the screw, especially in the region of its shank including a thread. In this way, the screw extends through and engages the through hole, respectively, in a fixed manner after pre-assembly. Thus, not only an axial lock is realized, but also a determined alignment of the axis of the screw with respect to the component. The alignment of the axis of the screw is determined in this way, and the screw cannot tilt. In case the screw only partly protrudes into the through hole, the thread of the screw is partly located in the region of the bush and partly at the side of the screw facing the head outside the through hole. In this way, the thread is located in a safe position during transportation from the manufacturer of the pre-assembled assembly unit to the place where the assembly unit is further used such that there is no damage. The screw or the screws are located in a fixed position and with aligned axes in the respective bush (and these in the through holes). As a result, function is improved and a captive arrangement is realized.

The bush forms a plug-like pre-assembly element for screwing in the screw. The supporting surface being located at the screw and serving to transmit the axial force is designed and arranged to directly contact the component without the bush. There is no negative effect on the application and the effect of the axial force in the tightened position of the screw. Preferably, the bush is made of plastic material, and it may be deformed without producing chips when the thread of the screw is screwed into it. The bush in the tightened position of the screw remains free from any axial force such that disadvantageous setting effects under a decrease of free tension are not to be expected. To attain a sealing effect between the work piece, the component and the head of the screw, it may make sense to chose the size of the bush such that a limited axial force required to attain the sealing effect is transmitted by the bush. These axial forces remain comparatively small such that no setting effects are to be expected in this case.

It may make sense that the screw in the region of its shank close to the supporting surface includes a ring groove which forms an undercut. The ring groove has a diameter which is less than the inner diameter of the bush and an effective axial length which is more than the length of the bush. Especially when a plurality of such screws is to be located in the pre-assembled position of the component in a way that it is designed for multiple screw connections with the work piece, it is important that the screw in the region of the shank between the supporting surface at the head and the threaded portion includes a ring groove forming an undercut. The diameter of the ring groove is less than the inner diameter of the bush, and its axial length is more than the axial length of the through hole in the component taking the respective transition radiuses into account. Due to the fixed arrangement of the screw, the axial lock and the alignment of the axis as well as the captive arrangement of the mounted assembly unit are reached in the pre-assembled unit. On the other hand, the screw and the screws, respectively, in the region of the ring channel forming the undercut gets free from the bush being located in the component in a radial and in an axial direction such that there is an adaptation of the screw or the screws at the work piece taking tolerances into account. As soon as the screw with its thread has exited the elastic-plastic deformable thread in the bush in the through hole of the component, the component may move and adapt, respectively, to a limited extent in an axial and/or a radial direction with respect to the work piece. The pretension force is applied by further tightening the screw. When a plurality of screws is used, a possible clamping effect of the component at the work piece due to the screws is eliminated when the threads of the screws exit the bushes. Consequently, the component reaches a free relative position with respect to the work piece. This adaptation may also be used when the screws are screwed into the work piece one after the other. The same applies when a plurality or all screws are screwed into the work piece simultaneously. In this case, it is especially advantageous to use screws which produce a thread, and not to arrange threads in the bores in the work piece which are engaged by the screws. Instead, the bores are designed as cast or cut bores. Then, it is not necessary to produce threads in the work piece during its manufacture. Instead, the screw produces the thread. Mutual clamping forces subjecting the component as a result of a plurality of screws are prevented since each screw produces its own thread in the bore in the work piece during its insertion into the bore. The relative angle position of the threads of the screws during the screwing in process with respect to one another are automatically taken into account. When respective tolerances are met, it is also possible to connect the pre-assembled assembly unit including the component and the screws with a work piece the bores of which are associated with the screws already including threads. This applies no matter whether a plurality of screws is simultaneously screwed into the work piece or one after the other. The use of the bush being made of a resilient material, especially of plastic, is advantageous.

The thread of each screw at its side facing away from the head of the screw may include a connecting portion in which the outer diameter of the thread is less than the inner diameter of the bush being located in the through hole in the component. This coordination is chosen in a way that the screw with the connecting portion may be inserted into the bush and, on the other hand, the function of the thread of the screw to produce a thread is used for an at least elastic deformation of the bush when the screw is screwed into the bush.

In all cases, the shank of the screw in the region of the thread may have a trilobulare cross section. Such a trilobulare cross section realizes a so-called orbiform. This means that there is the same size at all places around the circumference of the cross section when the diameter is determined with a change of 180 degrees, although the cross section approximately has a triangular shape. Such a trilobulare cross section also fulfills the function of a self-centering effect, and it allows for elastically/plastically forming the thread in the bush and possibly also in the work piece.

The bush may be fixedly arranged in the through hole of the component due to frictional engagement and/or to form fit. In this way, the bush is held in the through hole of the component in a way that it cannot be rotated. The through hole in the component and/or the outer diameter of the bush may have an unround design for this purpose. For example, it may be designed as a polygon, to include a radial protrusion, to have an oval cross section, as a square or the like. The fixed connection due to frictional engagement is realized by a respective size and by pressing the bush into the through hole. This may be achieved in different ways. The bush may be fixedly arranged in the through hole with an excess or surplus excess at both sides, at one side or without an excess.

The bush being located in the through hole of the component may have an inner diameter which is more than the core diameter of the shank of the screw which includes the thread. The design of a thread in the bush is less important since a screw with its thread gets free from the bush during tightening, anyway. It is sufficient if the screw in the pre-assembled position takes its fixed, aligned and captive seat in the bush which acts like a plug.

To prevent clamping of material of the bush during tightening, the screw may include an impression being designed as a continuous yielding channel which is arranged close to the supporting surface. The yielding channel is necessary in case the bush has an axial and radial excess towards the outside in the position after it has been pressed into the through hole. Usually, the yielding channel will be arranged inside at a smaller diameter, and the supporting surface will be arranged outside at a greater diameter.

The bush may have a greater structural height than the component in the region of the through hole. The bush at its side facing the head of the screw may include a collar protruding beyond the through hole in a radial direction or respective protrusions which limit the capability of pressing the bush into the through hole of the component. The collar and the protrusions form a stop when the screw is screwed in, and they prevent the bush from being pushed out off the through hole. Even without a collar and protrusions, the bush at least at its side facing the head of the screw outside the height of the component in the region of the through hole may be designed to be expandable by screwing in the screw. Consequently, the excess of the bush extending in an outward direction forms a stop protruding in a radial direction when the screw is screwed in.

The bush at its side facing away from the head of the screw may alternatively or additionally include a protrusion which protrudes over the through hole in the component in an axial direction. The protrusion forms an expanding rip to ensure fixed connection of the screw at the pre-assembled unit.

The screw at the free end of its shank may include a centering connection or a centering element having no thread. The centering connection has a smaller outer diameter than the inner diameter of the bush. The centering connection makes sense when the screw is screwed into the bush and into the threaded hole or the thread in the work piece.

The bush may have an inner diameter which is more than the flank diameter and which is less than approximately 90 percent of the outer diameter of the thread being located at the shank of the screw. The diameter of the through hole is located in the region defined by these two limits. In case these limits are kept, resistance is sufficiently small when the screw is screwed into the bush. The necessary pretension force may be applied after screwing in the screw in the desired and a reproducible way. Due to a special design of the collar being located close to the head of the bush, the bush may be pressed during tightening of the screw in a way that it fulfills the function of a sealing element being located below the head of the screw. For this reason, the size of the collar of the bush is coordinated with the size of the recess in the head of the screw. Again, no plastic material of the bush is pressed in when the screw is tightened. Thus, there is no danger of undesired setting effects and pretension losses occurring in the novel screw connection.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
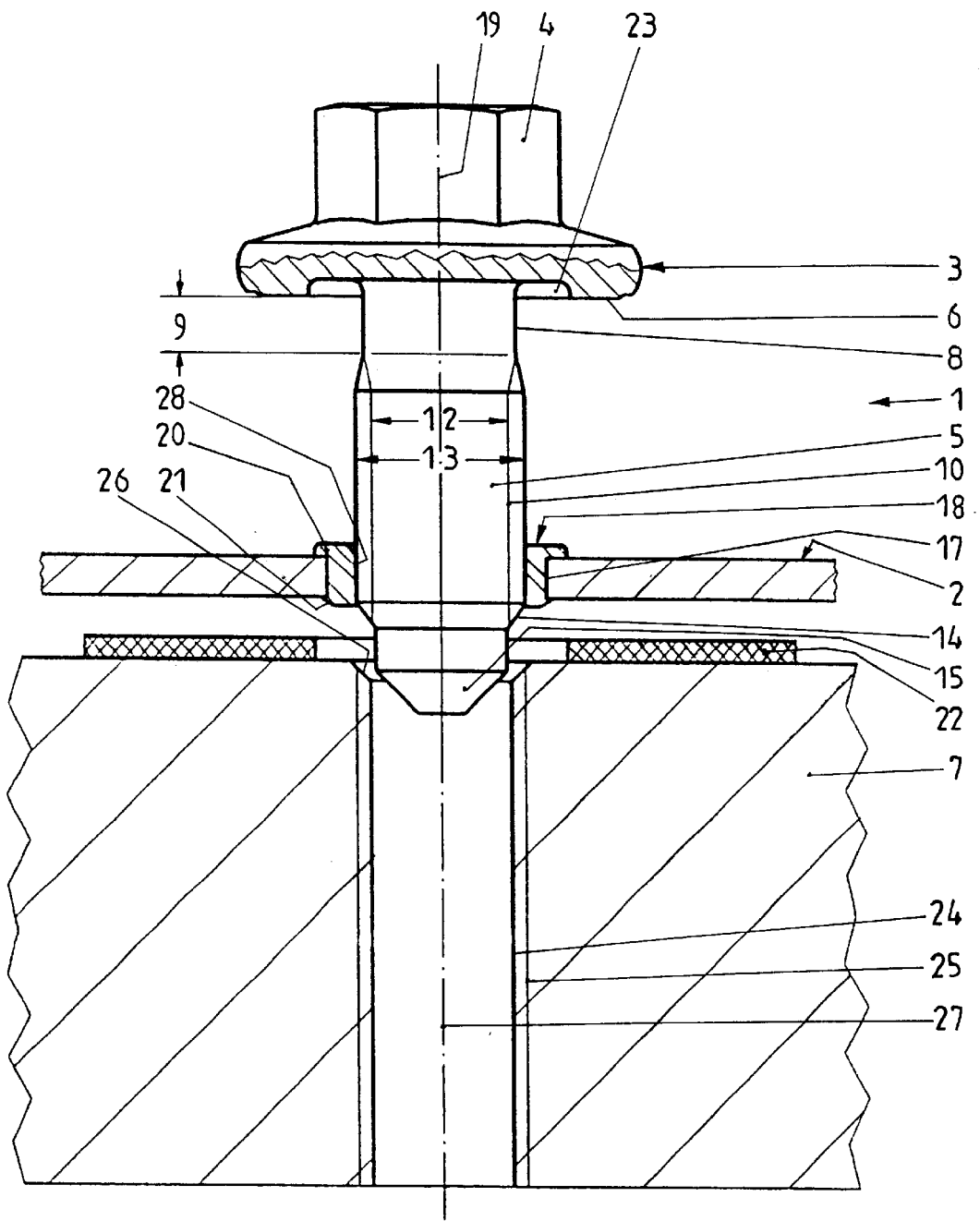
FIG. 1 is a sectional view of a first exemplary embodiment of the novel assembly unit while getting in contact with a work piece.

Referring now in greater detail to the drawings, FIG. 1 illustrates a part of a novel assembly unit 1. The assembly unit includes a component 2 and at least one screw 3. All the drawings only illustrate one screw 3 in combination with one component 2. It is to be understood that especially a plurality of screws 3 is connected to a component 2 in a spaced apart manner.

Figure 4:
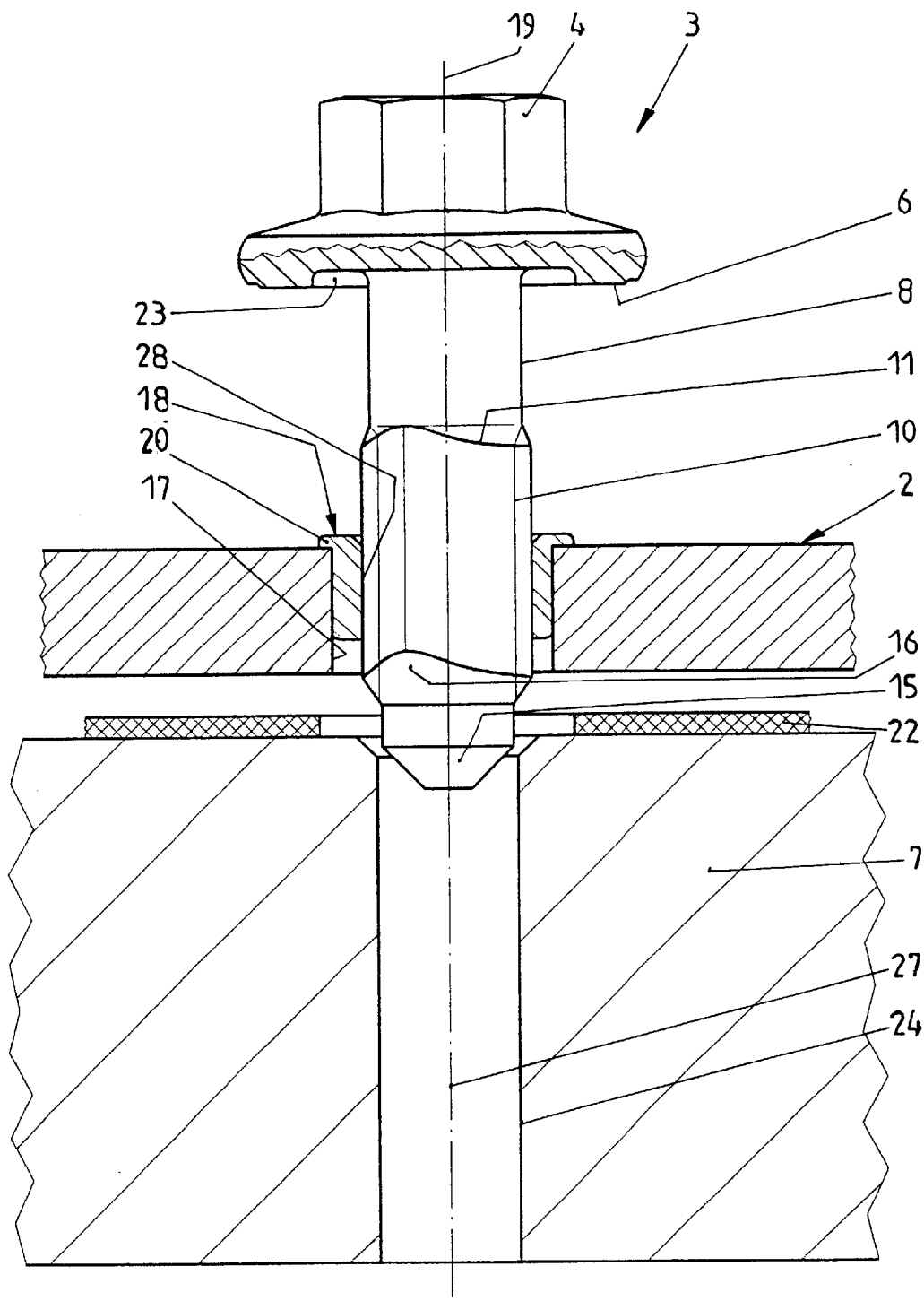
FIG. 4 is a view of a second exemplary embodiment of a part of the assembly unit while getting connected to a work piece.

The screw 3 includes a head 4 which has a known design for the connection to a torsional tool. The screw 3 further includes a shank 5. The head 4 at the transition to the shank 5 includes a supporting surface 6 which will get in contact to the component 2 during assembly of the assembly unit 1 at the work piece 7. The shank 5 of each screw 3 includes a ring groove 8 which starts from the head 4 and from the supporting surface 6, respectively, and which extends over an axial length 9 of the shank 5. A thread 10 is connected to the ring groove 8. In the illustrated exemplary embodiment, the thread 10 is designed as a metric thread, and it extends more or less over the entire length of the shank 5 close to the ring groove 8. However, the shank 5 in the region of the thread 10 may also have a trilobulare cross section 11 (FIG. 4). The cross section 11 is illustrated by a curved line in FIG. 4. The thread 10 at the shank 5 has a root diameter 12 and an outer diameter 13. The flank diameter of the thread 10 is determined according to the equation known in the art. A connecting portion 14 having a conical design may be arranged at the free end of the shank 5. Additionally, a centering connecting element or centering element 15 may be arranged, as illustrated. Along the length of the shank 5 of the thread 3 which produces a thread (FIG. 4), a portion 16 producing the thread and a smoothening portion are connected to the connecting portion 14.

Figure 3:
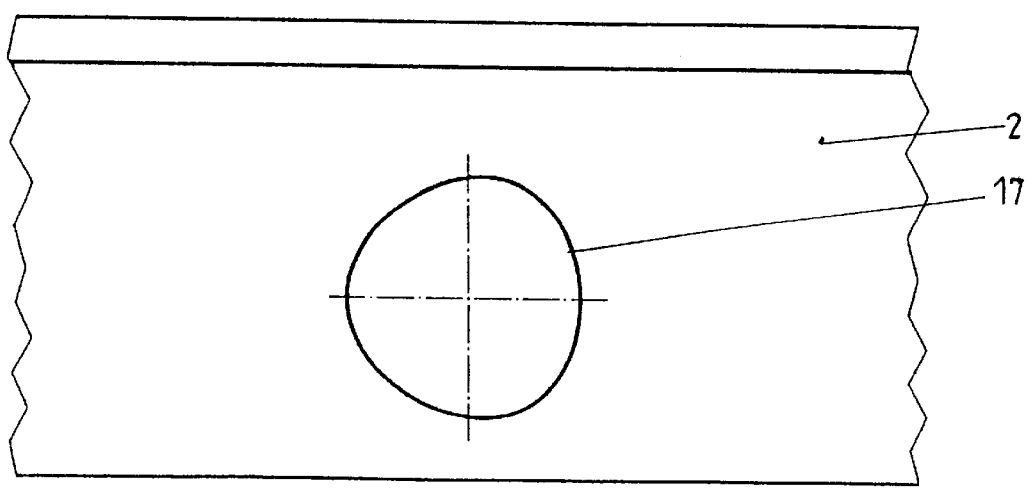
FIG. 3 is a top view of the component according to FIG. 1.

A through hole 17 is located at a certain place of the component 2. The hole 17 has a trilobulare cross section (FIG. 3). The through hole 17 may also be a continuous bore (FIG. 6) in the component 2. It is to be understood that the component 2 includes such a through hole 17 for each screw at the respective places.

Figure 8:
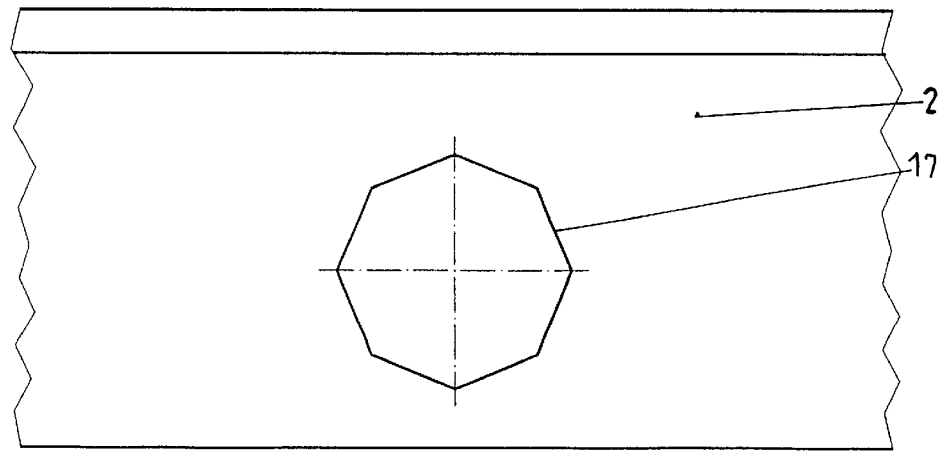
FIG. 8 is a top view of the component according to FIG. 7.

The through hole 17 in the component 2 especially does not have a round design. It may have a trilobulare design, as illustrated in FIG. 3, or a polygon design, as illustrated in FIG. 8. It may include a radial recess, or it may be designed as an elongated hole. All these unround cross sections of the through hole 17 serve to support a bush 18 without allowing its rotation. The bush 18 forms a plug-like pre-assembly element, and it serves to support the screw 3 at the component 2 in a way that the axis 19 of the screw 3 in the pre-assembly position is directed at a right angle with respect to the component 2 and to the work piece 7, respectively. The bush 18 may have a greater axial length than the thickness of the component 2. Especially, a collar 20 may be connected to the surface of the component 2 from the outside and it may form a stop preventing its further insertion or passing through the component 2. At the other side—meaning the side facing the work piece 7—the bush 18 may protrude beyond the component 2 to a certain extent, and it may include a protrusion which especially forms an expanding rib 21. In this way, the bush 18 is fixed in an axial direction in both directions. The axial excess of the expanding rib 21 is only desired in case this is constructively possible without a negative influence on the pre-stress force, for example in case a seal 22 is located between the component 2 and the work piece 7, the height of which is more than the axial excess of the expanding rib 21 at the bush 18. The bush 18 is made of plastic material which is substantially more elastic than sheet metal. For example, this is necessary to compensate mismatch with respect to the center when a plurality of screws 3 is screwed into the work piece 7.

Figure 2:
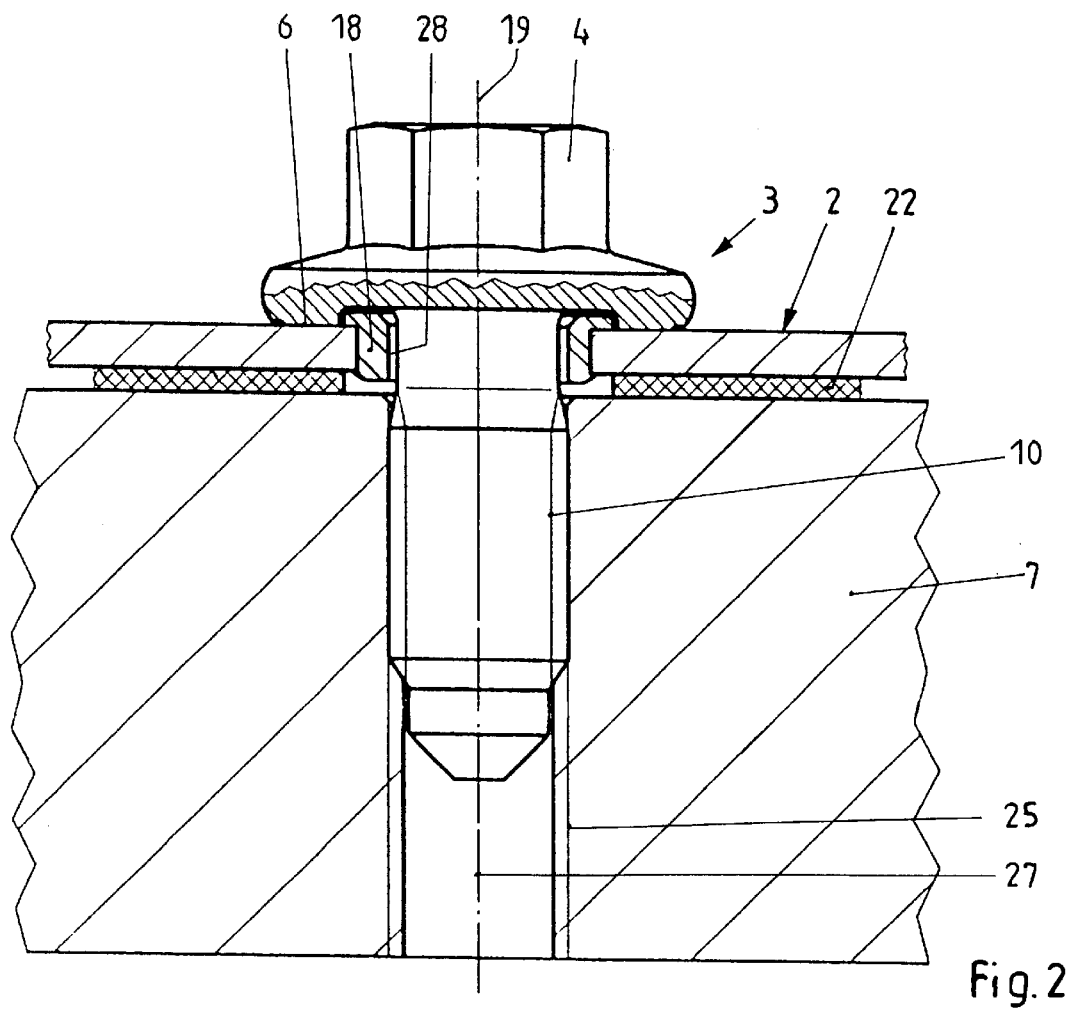
FIG. 2 is a sectional view of a part of the assembly unit according to FIG. 1 after its assembly at the work piece.

The screw 3 in the region around the shank 5 being surrounded by the supporting surface 6 includes a continuous impression 23 being designed and arranged to support the collar 20 of the bush 18. It is sized in a way that the collar 20 is supported in the impression 23 with sufficient play or clearance in axial and radial directions when the screw is tightened. In this condition (FIG. 2), the impression 23 supports the material of the collar 20 of the bush 18 with a clearance such that there is no negative effect on the transmittance of the axial force by the supporting surface 6 to the component 2. Especially, no plastic material is clamped between the supporting surface 6 and the surface of the component 2 which could lead to setting effects.

A bore 24 with a thread 25 being associated with the screw 3 is located in the work piece 7. The thread 25 is associated with the thread 10 of the screw 3. The bore 24 at its top includes a chamfer 26 (FIGS. 1 and 5) which serves to simplify insertion of the centering element 15 into the bore 24 and into the connecting portion 14, respectively.

Pre-assembly of the novel assembly unit including a component 2 and at least one screw 3 by the bush 18 may be conducted in different ways. In a first way of assembly, the bush 18 is inserted into the through hole 17 of the component 2 without allowing for rotation. Then, the screw 3 is inserted into the bush 18, and it is screwed in approximately as far as it is to be seen in FIG. 1. Consequently, the bush 18 expands in a radial direction. The bush 18 secures its unrotatable seat, and it fixes the screw with its axis 19 in an adjusted way. It is to be understood that the component 2 usually is connected to a plurality of such screws 3. The assembly unit is then put on the work piece 7, as this is illustrated in an intermediate step in FIG. 1. Then, the screws 3 are further screwed in. This may be done at a time or successively. The centering connections 15 get into the bore 24. Due to elasticity of the plastic material of the bushes 18, they may yield with respect to one another to a limited extent to compensate offset of the axes 27 of a plurality of bores 24 being located in the work piece 7. The threads 10 engage the threads 25. At the end of the screwing procedure, each screw 3 has a relative position, as this is to be seen in FIG. 2. Each screw with its thread 10 has exited from the bush 18 to be free from the bush 18. In this position, the bush 18 does not have a function. The pre-stress force is exclusively transmitted by the connecting surface 6.

During assembly, it is also possible to first bring the bushes 18 into contact with the screws 3, meaning to push them onto the thread 10. Such units of the screw 3 and the bush 18 may then be pressed into a through hole 7 being located at the component 2. Again, the elastic-plastic flexibility of the plastic material of the bush 18 is used for this step of assembly. Tightening is then realized in the same way, as this has already been described above. Finally, and end position occurs, as this is to be seen in FIG. 2.

To locate and adjust the screw 3 in the bush 18 in the component 2 in a fixed manner, the bush 18 has an inner diameter 28 which is less than the outer diameter 13 of the shank 5 of the screw 3 including the thread 10. Due to the coordination of the two diameters with respect to one another, the expanding effect of the screw 3 on the bush 18 is determined.

FIG. 4 illustrates another exemplary embodiment of the novel assembly unit 1. The assembly unit 1 is mostly similar to the embodiment of FIGS. 1 to 3. Therefore, it is referred to the above description. As a difference, the thread 10 of the screw 4 is not designed as a metric thread, but as a thread producing thread 10 having a trilobulare cross section 11.

Consequently, a simple bore is located in the work piece 7, the screw 4 automatically producing its thread when the screw 4 is screwed into the bore. In this case, the bush 18 has a comparatively short axial length. It includes a protruding collar 20 which functions as a stop to limit the insertion movement of the bush 18 into the through hole 17. The through hole 17 also has a trilobulare cross section (FIG. 3). There is no expanding rip 21 at the lower end of the bush 18. Such a bush 18 is especially suitable to be pressed into the opening 17 of the component 2 in an axial direction in the mounted position together with a screw 4.

Figure 5:
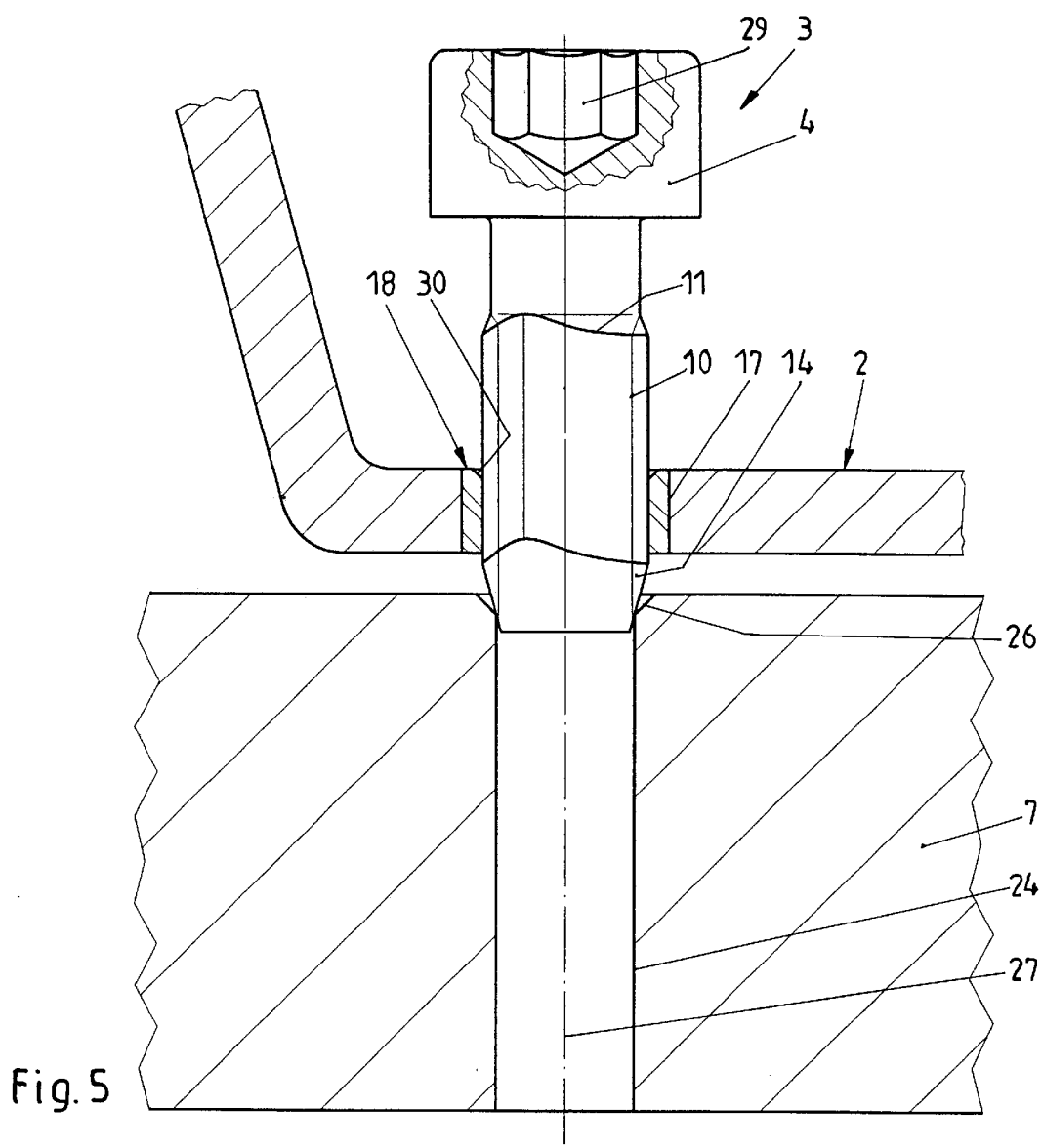
FIG. 5 is a view of a third exemplary embodiment of a part of the assembly unit while getting connected to a work piece.
Figure 6:
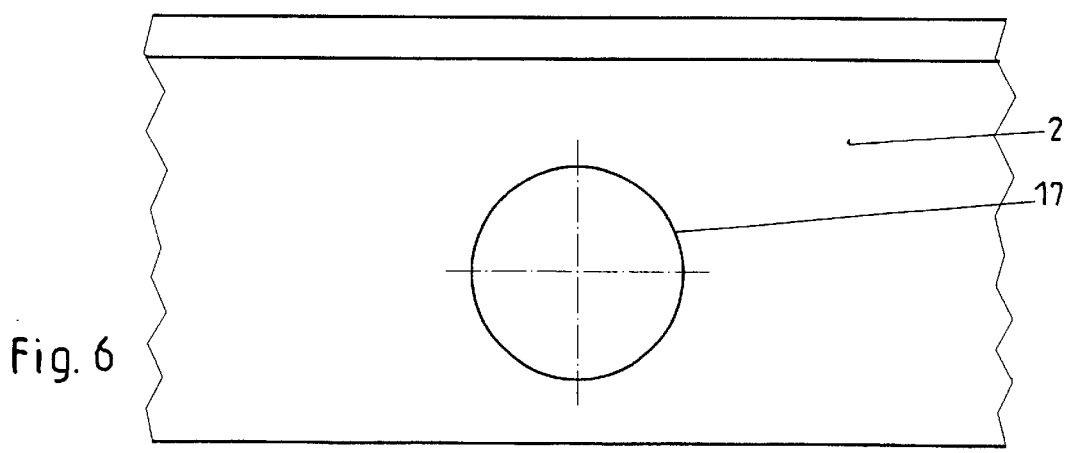
FIG. 6 is a top view of the component according to FIG. 5.

FIGS. 5 and 6 illustrate a third exemplary embodiment of the novel assembly unit 1. The screw 4 includes an inner hexagon 29 and a thread 10 producing a thread and having a trilobulare cross section 11. The screw 4 is designed to produce a thread, and it cooperates with a bore 24 being located in the work piece 7.

The axial length of the bush 18 is coordinated with the thickness of the component 2 in a way that such a bush 18 may be pressed into the through hole 17 being located in the component 2. Due to the following screwing in movement of the screw 4, the bush 18 attains its fixed, unrotatable seat, whereas the screw 4 may also be rotated after its first contact with the bore 24 of the work piece 7 without the bush 18 leaving its fixed seat within the component 2. Since the bush 18 does not protrude in both axial directions, this construction may be advantageously used when there is no seal 22. The bush 18 in its upper portion may include a chamfer 30 which makes it easier to insert the screw 4 into the bush 18 during pre-assembly of the assembly unit 1. The bush 18 at its outer diameter may be greater than the through hole 17 to attain a positive effect on the fixed seat after the pressing movement and to attain unrotatable support by frictional engagement. It is also possible to connect the bush 18 in the through hole 17 by glue or the like. However, generally such measures are not necessary.

Figure 7:
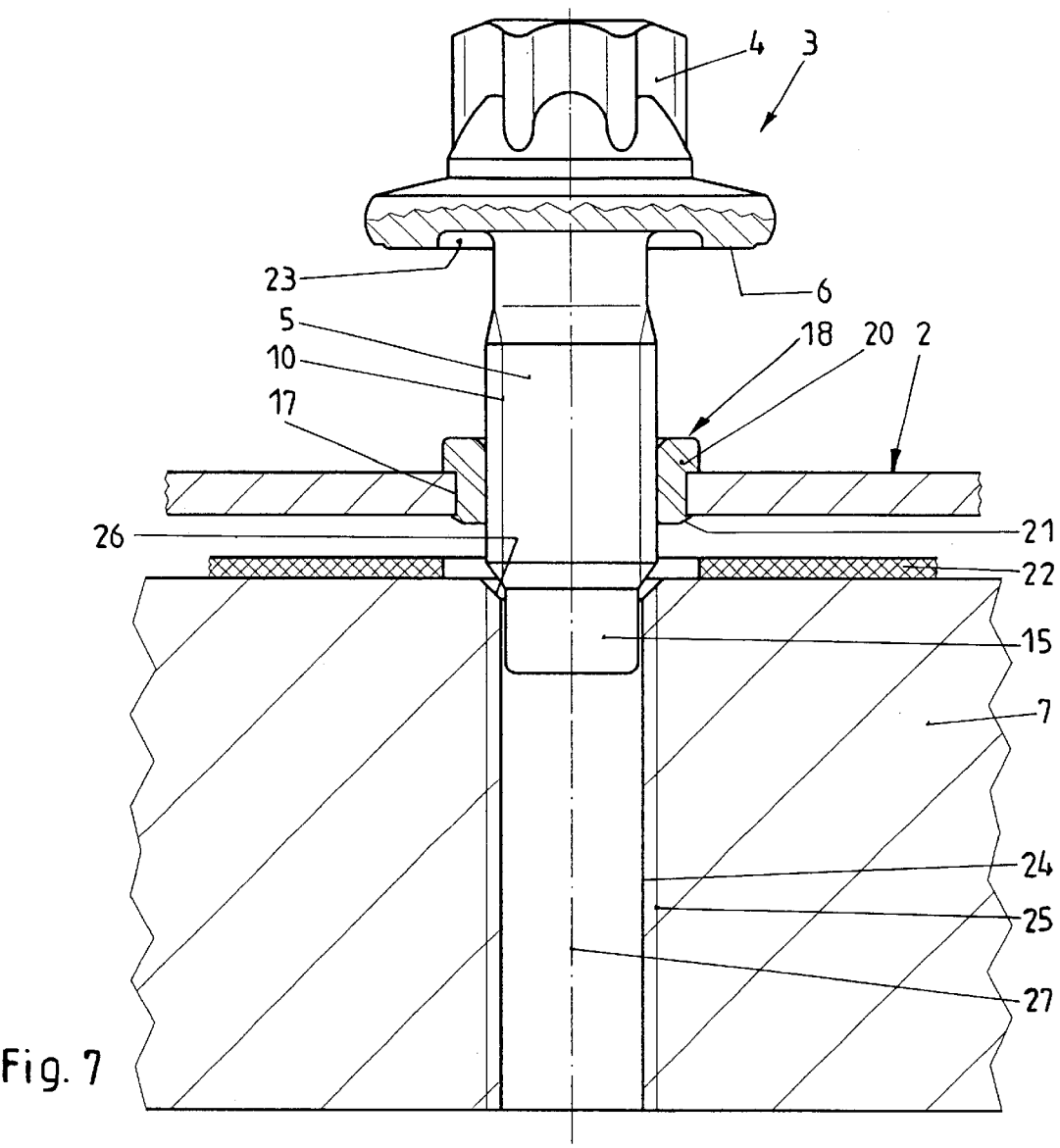
FIG. 7 is a view of a fourth exemplary embodiment of a part of the assembly unit while getting connected to a work piece.

FIGS. 7 and 8 illustrate a fourth exemplary embodiment of the novel assembly unit 1. The screw 3 includes a head 4 having a lobated cross section. The impression 23 close to the supporting surface 6 has an axial length which is less than the collar 20 of the bush 18 in a way that a sealing effect is attained at this place in the tightened position. The through hole 17 in the component 2 has an octagon cross section. Accordingly, the bush 18 at its outer side has a respective cross section to support the bush 18 in the component 2 without allowing for rotation. Other aspects are similar to the embodiments of FIGS. 1 to 3.

For example, the work piece 7 may be a lower or bottom element, a transmission case or the like. The component 2 may be an upper or top element, a transmission cover or the like. During assembly of the assembly unit 1 at the work piece 7, it may be necessary or desired to use a seal 22 having a respective opening. The bore 24 in the work piece 7 desirably includes a chamfer 26 to make it easier to insert the centering connection 15 of the shank 5 of the screw 3.

Many variations and modifications may be made to the preferred embodiments of the invention without departing substantially from the spirit and principles of the invention. All such modifications and variations are intended to be included herein within the scope of the present invention, as defined by the following claims.

We claim:

1. An assembly unit comprising:
   at least one component having a generally planar surface;
   at least one screw including a shank at least partially including a thread, a head being designed and arranged to rotate said screw and a supporting surface facing said component,
   said supporting surface being designed and arranged to directly contact said component surface after assembly to transmit an axial force, and
   said component for said at least one screw including a through hole having a diameter; and
   at least one bush having an outer diameter and an inner diameter, being associated with said at least one screw and being designed and arranged to be fixedly connected in said respective through hole,
   said bush at its side facing said head of said screw including a collar protruding beyond said through hole in a radial direction over at least a portion of said component surface,
   said supporting surface being designed and arranged to directly contact said component after assembly without contacting said bush to transmit an axial force,
   said bush, said screw and said component being designed and arranged to be locked and aligned in an axial direction by the diameter of said through hole,
   the outer diameter and the inner diameter of said bush and said shank of said screw being designed and arranged with respect to one another in a way tat said screw after its pre-assembly protrudes through said through hole in a fixed manner.

2. The assembly unit of claim 1, wherein said bush has a length and said screw in the region of its shank close to said supporting surface includes a ring groove forming an undercut, said ring groove having a diameter which is less than the inner diameter of said bush and an effective axial length which is more than the length of said bush.

3. The assembly unit of claim 2, wherein said shank has a core diameter and the inner diameter of said bush is more than the core diameter of said shank.

4. The assembly unit of claim 1, wherein said bush is fixedly connected in said through hole due to frictional engagement.

5. The assembly unit of claim 4, wherein said shank has a core diameter and the inner diameter of said bush is more than the core diameter of said shank.

6. The assembly unit of claim 1, wherein said bush is fixedly connected in said through hole due to form fit.

7. The assembly unit of claim 6, wherein said shank has a core diameter and the inner diameter of said bush is more than the core diameter of said shank.

8. The assembly unit of claim 1, wherein said shank has a core diameter and the inner diameter of said bush is more than the core diameter of said shank.

9. The assembly unit of claim 1, wherein said screw includes an impression being designed as a continuous yielding channel, said impression being arranged close to said supporting surface and being designed and arranged to prevent clamping of material of said bush during tightening said screw.

10. The assembly unit of claim 1, wherein said bush has greater height than said component in the region of said through hole.

11. The assembly unit of claim 10, wherein said bush at least at its side facing said bead of said screw outside the height of said component in the region of said through hole is designed to be expandable by screwing in said screw.

12. The assembly unit of claim 11, wherein said bush at its side facing away from said head of said screw includes a protrusion which forms an expanding rib, said protrusion being designed and arranged to extend beyond said through hole in an axial direction.

13. The assembly unit of claim 1, wherein said bush at its side facing away from said head of said screw includes a protrusion which forms an expanding rib, said protrusion being designed and arranged to extend beyond said through hole in an axial direction.

14. The assembly unit of claim 1, wherein said shank of said screw has a free end at which a centering element is arranged, said centering element including no thread and having a smaller outer diameter than the inner diameter of said bush.

15. The assembly unit of claim 1, wherein said thread of said screw has a flank diameter and an outer diameter, and the inner diameter of said bush is more than the flank diameter and less than approximately 90 percent of the outer diameter.

16. An assembly unit, comprising:
at least one component having generally planar surface;
at least one screw including a shank at least partially including a thread, a head being designed and arranged to rotate said screw and a supporting surface facing said component,
said supporting surface being designed and arranged to directly contact said component surface after assembly to transmit an axial force,
said component for said at least one screw including a through hole having a diameter;
at least one bush having an outer diameter and an inner diameter, being associated with said at least one screw and being designed and arranged to be fixedly connected in said respective through hole,
said bush at its side facing said head of said screw including at least one protrusion which limits the capability of pressing said bush into said through hole of said component, said protrusion protruding beyond said through hole in a radial direction over at least a portion of said component surface,
said supporting surface being designed and arranged to directly contact said component after assembly without contacting said bush to transmit an axial force,
said bush, said screw and said component being designed and arranged to be locked and aligned in an axial direction by the diameter of said through hole, and
the outer diameter and the inner diameter of said bush and said shank of said screw being designed and arranged wit respect to one another in a way that said screw after its pre-assembly protrudes through said through hole in a fixed manner.

17. The assembly unit of claim 16, wherein said bush at least at its side facing said head of said screw outside the height of said component in the region of said through hole is designed to be expandable by screwing in said screw.

18. The assembly unit of claim 17, wherein said bush at its side facing away from said head of said screw includes a protrusion which forms an expanding rib, said protrusion being designed and arranged to extend beyond said through hole in an axial direction.

19. An assembly unit, comprising:
at least one component having a generally planar surface;
at least one screw including a shank at least partially including a thread, a head being designed and arranged to rotate said screw, a supporting surface facing said component and a ring groove, said ring groove being arranged in the region of said shank close to said supporting surface,
said supporting surface being designed and arranged to directly contact said component surface alter assembly to transmit an axial force, and
said component for said at least one screw including a through hole having a diameter; and
at least one bush having a length, an outer diameter and an inner diameter, being associated with said at least one screw and being designed and arranged to be fixedly connected in said respective through hole,
said ring groove having a diameter which is less than the inner diameter of said bush and an effective axial length which is more than the length of said bush,
said bush at its side facing said head of said screw including a collar protruding beyond said through hole in a radial direction over at least a portion of said component surface,
said supporting surface being designed and arranged to directly contact said component after assembly without contacting said bush to transmit an axial force,
said bush, said screw and said component being designed and arranged to be locked and aligned in an axial direction byte diameter of said through hole,
the outer diameter and the inner diameter of said bush and said shank of said screw being designed and arranged with respect to one another in a way that said screw after its pre-assembly protrudes through said through hole in a fixed manner.

20. The assembly unit of claim 19, wherein said bush is fixedly connected in said through hole due to frictional engagement.

21. The assembly unit of claim 20, wherein said shank has a core diameter and the inner diameter of said bush is more than the core diameter of said shank.

22. The assembly unit of claim 19, wherein said bush is fixedly connected in said through hole due to form fit.

23. The assembly unit of claim 22, wherein said shank has a core diameter and the inner diameter of said bush is more than the core diameter of said shank.

24. The assembly unit of claim 19, wherein said shank has a core diameter and the inner diameter of said bush is more than the core diameter of said shank.

25. The assembly unit of claim 19, wherein said screw includes an impression being designed as a continuous yielding channel, said impression being arranged close to said supporting surface and being designed and arranged to prevent clamping of material of said bush during tightening said screw.

26. The assembly unit of claim 19, wherein said bush has greater height than said component in the region of said through hole.

* * * * *